United States Patent [19]

Becker

[11] Patent Number: 4,582,360
[45] Date of Patent: Apr. 15, 1986

[54] HINGE FOR SEAT WITH ADJUSTABLE BACKREST, PARTICULARLY POWER VEHICLE SEAT

[75] Inventor: Paul Becker, Landau, Fed. Rep. of Germany

[73] Assignee: Keiper Recaro GmbH & Co., Remscheid, Fed. Rep. of Germany

[21] Appl. No.: 507,125

[22] Filed: Jun. 23, 1983

[30] Foreign Application Priority Data

Jun. 25, 1982 [DE] Fed. Rep. of Germany ....... 3223707

[51] Int. Cl.$^4$ .............................................. E05D 11/10
[52] U.S. Cl. ...................................... 297/362; 74/409
[58] Field of Search .................... 297/362; 74/805, 409

[56] References Cited

U.S. PATENT DOCUMENTS

| | | | |
|---|---|---|---|
| 1,646,202 | 10/1927 | Johnson | 74/805 |
| 4,054,966 | 10/1977 | Putsch et al. | 297/362 |
| 4,227,741 | 10/1980 | Gross et al. | 74/409 |
| 4,371,207 | 2/1983 | Wilking et al. | 297/362 |
| 4,407,544 | 10/1983 | Bahring | 297/362 |

Primary Examiner—William E. Lyddane
Assistant Examiner—Joseph Falk
Attorney, Agent, or Firm—Michael J. Striker

[57] ABSTRACT

A hinge for a seat, particularly a power vehicle seat, has a stationary hinge member associated with a seat part of the seat, a pivotable hinge member associated with a backrest part of the seat, a pivot axle pivotally connecting the hinge members with one another, an adjusting and fixing device arranged to determine a position of the hinge members relative to one another and formed as a wobble transmission including an eccentric member associated with a cam region of the pivot axle and rotatable together with the latter, an accumulator arranged in the cam region of the pivot axle to radially adjust an eccentricity which determines an engaging point of the wobble transmission and formed as an eccentric ring with an inner longitudinal opening in direction of eccentricity and surrounding a centric portion of the pivot axle, a pressing member located between the longitudinal opening and the centric portion of the pivot axle and arranged to be pressed by the accumulator for maintaining an extreme eccentricity in immovable condition, and a cam member arranged to connect in case of adjusting the eccentric ring with the centric portion of the pivot axle against the action of the accumulator with reducing of the eccentricity and in a torque-transmitting manner.

10 Claims, 15 Drawing Figures

HINGE FOR SEAT WITH ADJUSTABLE BACKREST, PARTICULARLY POWER VEHICLE SEAT

BACKGROUND OF THE INVENTION

The present invention relates to a hinge for a seat with an adjustable backrest, particularly a power vehicle seat.

Hinges of the above mentioned general type are known in the art. A known hinge includes a stationary hinge member associated with a seat part of the seat, a pivotable hinge member associated with a backrest part of the seat, a pivot axle connecting the hinge members with one another, and an adjusting and fixing device which determines the position of both hinge members relative to one another and is formed as a wobble transmission. The wobble transmission has an eccentric member arranged in a cam region of the pivot axle and rotatable with the latter, and an accumulator which is arranged in the cam region of the pivot axle and adjusts in radial direction the eccentricity of the eccentric member which determines the engagement point of the toothing of the wobble transmission. In a known hinge, the pivot axle has a non-round cam region which for example has at least sectionally a rectangular cross section. This cam region is surrounded by a circular disk provided with an eccentrically arranged recess which is also rectangular at least sectionally and closingly surrounds the cam region on two opposite cam surfaces extending parallel to the eccentricity direction. The surfaces of the recess in the circular disk which are arranged transverse to the eccentricity direction overlap the respective opposite surfaces in the cam region of the pivot axle with play. This play can be bridged by an adjusting member in the sense of an eccentric arrangement of the circular disk on the cam region of the pivot axle. The adjusting member can be formed as an adjusting screw, on the one hand, with which the eccentricity of the circular disk relative to the eccentric portion of the pivot axle can be adjusted. On the other hand, the adjusting member can be composed of a spring element which is arranged between the cam region of the pivot axle and the circular disk surrounding the same in the eccentricity direction. The circular disk which is eccentrically held on the cam region forms the eccentric member which, because of the adjusting member spanned between the cam region and the circular disk, provides a tensioning between the transmission parts supported on the eccentric member and on the centric portion of the pivot axle, as well as provides their bearing points. Thereby, the radial play, particularly in the toothing region, is continuously eliminated. Since, however, the tensioning of the eccentric on the pivot axle remains constant, the tensioning both in the fixed position and during the adjusting movement is available. In particular during the adjusting movement such an eccentric tensioning leads, however, to difficulties in manipulating, so that a relatively high adjusting moment must be applied.

SUMMARY OF THE INVENTION

Accordingly, it is an object of the present invention to provide a hinge for a seat with an adjustable backrest, particularly a power vehicle seat, which avoids the disadvantages of the prior art.

More particularly, it is an object of the present invention to provide a seat with an adjustable backrest, particularly a power vehicle seat, which in immovable position is blocked for eliminating the radial play and in which this blocking is lifted with the adjusting movement without additional manually operating elements.

In keeping with these objects and with others which will become apparent hereinafter, one feature of the present invention resides, briefly stated, in a hinge in which an eccentric member is formed as an eccentric ring which has an inner opening formed as a longitudinal opening extending in the direction of eccentricity and which surrounds a centric substantially circular portion of the pivot axle, and between the longitudinal opening and the centric portion of the pivot axle a pressing member is located which is pressed by an accumulator and arranged for maintaining an extreme eccentricity, on the one hand, and also a cam is arranged by which in the case of adjusting the eccentric ring is connected against the action of the accumulator with the centric portion of the pivot axle with reduction of the eccentricity in torque-transmitting manner.

The longitudinal opening is arranged eccentrically relative to the circumference of the eccentric ring and composed of two circular arcs whose radii correspond to the radius of the centric portion of the pivot axle, and the central point of these radii are located at a distance from one another in the eccentricity direction in correspondence with the blocking path. It is thereby guaranteed that in immovable position of the hinge the eccentric ring is displaced by the accumulator in an extreme eccentric position which is composed of the eccentricity value proper and the blocking path. In the case of adjustment the eccentric ring is displaced back by the adjusting movement against the action of the accumulator over the cam to its normal eccentric position with clearing the blocking path, so that normal play conditions are again produced, and therefore the conventional easy adjustment of the hinge is possible. In the event of interruption or termination of the adjusting movement, the eccentric ring is again displaced via the accumulator to its extreme eccentric position, whereby elimination of the radial play in the immovable position of the hinge is automatically provided. The means required for this can be retained within limits and manufactured in a simple way.

For providing a simple adjusting unit with a reliable torque transmission, on the one hand, and reliable return of the eccentric ring to its radial play-eliminating position, on the other hand, another feature of the present invention resides in that the pressure member is loaded directly by the accumulator, and the accumulator is located diametrically opposite to the cam member which engages in a recess of the eccentric ring and is supported on the centric portion of the pivot axle. The cam member is formed advantageously as a pin extending in an axial direction of the pivot axle.

In accordance with another advantageous feature of the present invention, the pressing member is formed as a fitting piece which engages in a longitudinal groove of the eccentric ring and has a concave pressing surface, and the accumulator acting upon the fitting member is formed as a set of cup springs engageable by a guiding pin and arranged between the pressing member and a base of the longitudinal groove of the eccentric ring. When the hinge is designed in accordance with these features, the receiving space for the accumulator is formed in the eccentric ring, so that the centric portion of the pivot axle remains in this region not weakened.

In accordance with still a further feature of the present invention, the pressing member is formed as a fitting member which engages in a recess of the centric portion of the pivot axle and has a concave pressing surface, and the accumulator acting upon the fitting member is formed as a set of cup springs arranged between the pressing member and a base of the recess of the centric portion of the pivot axle. Thus the accumulator is received by a hollow space in the centric portion of the pivot axle, so that the eccentric ring in this region is retained without weakening of its cross section.

It may, however, be advantageous in some cases when instead of an exclusive cross-section weakening one over the other structural parts, for example either the eccentric ring or the centric portion of the pivot axle, both structural parts have a considerably lower cross section weakening. In accordance with a further feature of the present invention this can be attained when the pressing member is formed as a fitting member which engages in a longitudinal groove of the eccentric ring and has a convex pressing surface abutting against a flattening of the centric portion of the pivot axle.

For making possible in the beginning of the adjusting movement to overcome the spring force of the accumulator which maintains an extreme eccentricity with providing a minimum torque, and also to make possible maintaining the adjusting angle of the centric portion of the pivot axle minimum relative to the eccentric ring surrounding the same, a further feature of the present invention resides in that the cam member is formed as a pin which is pressed against a flattening of the centric portion of the pivot axle by two laterally arranged supporting rollers having identical axes. Therefore during adjusting movement, first a friction-free rolling movement of the supporting rollers on the pin takes place, on the one hand, and the flattening of the centric portion of the pivot axle, on the other hand, to finally attain in the end position a clamping and thereby fixing of the eccentric ring on the centric portion of the pivot axle.

For adjusting the accumulator directly by the displacement movement of the cam automatically without any action for returning the extreme eccentric position for the adjusting movement to the normal eccentric position, a further feature of the present invention resides in that, in addition to the cam which is formed as a pin, the pressing member is also formed as a pin extending in an axial direction and loaded by the accumulator which is arranged in a recess of the centric portion of the pivot axle, wherein the pins are connected with one another by a flexible pulling member extending through the centric portion of the pivot axle.

For making possible the displacement of the eccentric ring to its extreme eccentric position by the cam member, when in accordance with the above described feature the cam member is formed as a pin and is directly loaded by the accumulator located in the recess of the centric portion of the pivot axle, the pin sectionally engages in a recess of the eccentric ring which surrounds the pin at both sides with a play and touches at its upper side, the pin also closingly engages sectionally in a groove of the centric portion of the pivot axle with the accumulator in compressed state, and a pressing strip is provided in the centric portion at its side opposite to the pin and has a roller-shaped projection engaging in immovable condition in a notch of the eccentric ring.

The latter-mentioned feature also permits to provide two recess portions in the centric portion of the pivot axle which are offset from a radial plane of the pressing strip and arranged at opposite sides from the latter, and the accumulator can include two accumulator members each located in a respective one of the recess portions and provided with a pressing disk via which it abuts inwardly against the eccentric ring.

For avoiding great cross section weakening of the centric portion of the pivot axle, the cam can include two pins which each have a recess and engage in a respective one of the recesses of the eccentric ring and in a respective one of the recesses of the centric portion of the pivot axle in play-free manner in case of adjusting, and the accumulator can have two accumulator members each engaging in a respective one of the recesses of the centric portion of the pivot axle and also in a respective one of the recesses of the pin.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
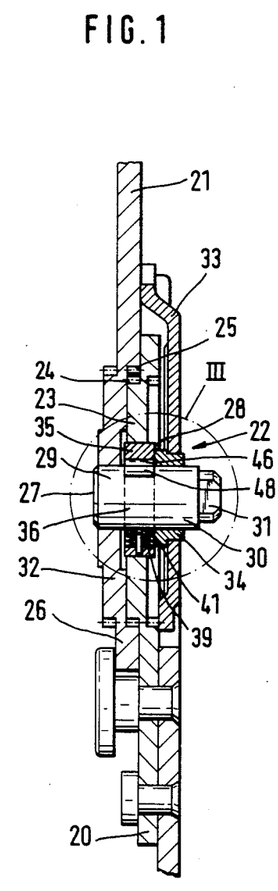
FIG. 1 is a view showing a longitudinal section of a hinge in accordance with one embodiment of the invention, taken along the line I—I in FIG. 2.
Figure 2:
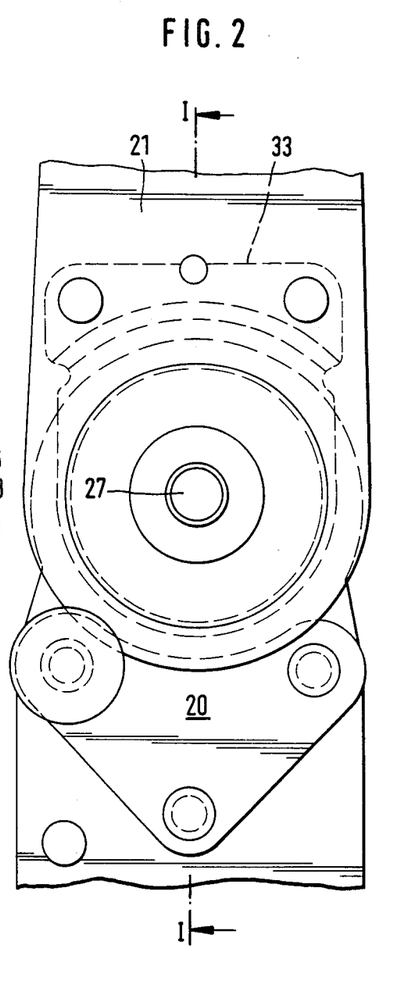
FIG. 2 is a front view of the hinge of FIG. 1 from the inner side of the seat.

A hinge shown in FIGS. 1 and 2 includes a hinge member 20 to be mounted on a seat part, a hinge member 21 to be mounted on a backrest, and an adjusting arrangement 22. The hinge member 20 has a spur gear 23 with an outer toothing 24 formed for example by punching out. The outer toothing 24 engages with an inner toothing 25 of a toothed rim 26 of the hinge member 21, which can also for example be formed by punching out. The diameter of the head circle of the outer toothing 24 is at least by one tooth height smaller than the diameter of the foot circle of the inner toothing 25. Correspondingly, the toothings 24 and 25 have teeth numbers which differ from one another by at least one tooth, wherein the teeth number of the inner toothing 25 is greater than the teeth number of the outer toothing 24. The arrangement is selected so that the inner toothing of the hinge member 21 can roll on the outer toothing 24 of the spur gear 23 of the hinge member 20.

Both hinge members 20 and 21 are supported on a pivot axle 27 which surrounds an eccentric member 28 between its two centric portions 29 and 30. Moreover, the pivot axle 27 has at its one end a cam pin 31 which in the embodiment shown in FIG. 1 is located immediately adjacent to the centric portion 30. A disk 32 of the hinge member 21 which is punched out by formation of the inner toothing 25 is supported on the portion 29 of the pivot axle 27. A bearing shield 33 which is fixedly connected with the hinge member 21, for example by riveting, overlaps a bearing bush 34 which is for example pressed in, in the region of the eccentric member 28 and is supported on a portion 30 which is concentric to the centric portion 29 of the pivot axle 27.

Figure 9:
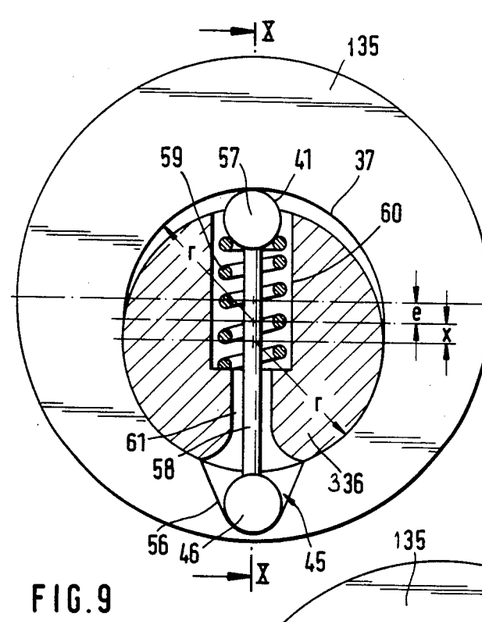
FIG. 9 is a view showing a further embodiment of the inventive pivot axle in a section through the centric portion which carries the eccentric, wherein the eccentric ring is arranged in its extreme eccentric position.

The spur gear 23 of the hinge member 20 connected with the seat part is supported between the bearing shield 33 and the disk 32 of the hinge member 21 on the eccentric member 28 of the pivot axle 27. An eccentric ring 35 is an important component of the eccentric member and is arranged on a portion 36 of the pivot axle. This portion 36 has a circular cross section and is arranged concentrically to the centric portions 29 and 30. It also can be of the same diameter as these portions, so that the pivot axle 27 in its all three portions 29, 30 and 36 can be formed as a throughgoing pin, which is true for all embodiments of the present invention. The eccentric ring 35 which surrrounds the portion 36 of the pivot axle has an elongated opening 37 which is eccentrically offset relative to its outer diameter. The radius r of the longitudinal opening 37 corresponds to the radius of the portion 36 of the pivot axle, whereas the center point of the radius r is offset relative to the center point of the outer periphery of the eccentric ring 35 by an eccentricity value e. This eccentricity value corresponds in a known manner to the difference between the radius of the foot circle of the inner toothing 25 and the radius of the head circle of the outer toothing 24. The central point of the second radius r of the elongated opening 37 is offset in the direction of the eccentricity relative to the center point of the first radius r of the longitudinal opening 37 by the value x. This value x provides for the displacement path of the pivot axle 27 required for blocking of the hinge, and in addition with the eccentricity value e provides for an extreme eccentricity of the eccentric ring 35 on the portion 36 when this portion lies in the lower region of the elongated opening 37. This condition is shown in FIG. 9 and is true for all embodiments.

Figure 3:
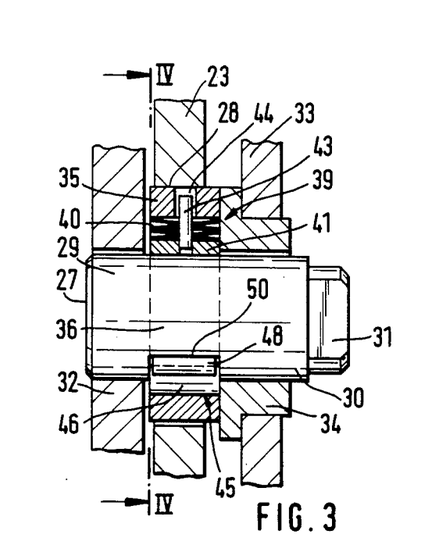
FIG. 3 is a view showing a fragment 3 of a pivot axle of FIG. 1 with an eccentric ring and hinge members arranged on the pivot axle, on an enlarged scale and turned relative to the view of FIG. 1 by 180°.
Figure 4:
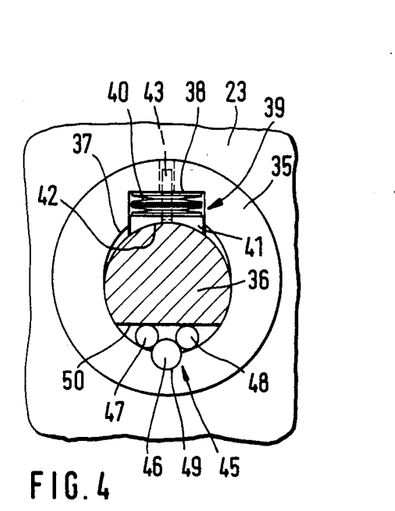
FIG. 4 is view showing the pivot axle of FIG. 3 in a section taken along the line IV—IV in FIG. 3, and with the eccentric ring arranged on the pivot axle.

In accordance with the embodiment shown in FIGS. 3 and 4, the eccentric ring is provided with a rectangular longitudinal groove 38 which extends from the longitudinal opening 37 in direction towards the highest point of the eccentric of the eccentric ring 35. An accumulator 39 is arranged, at the one end, in the longitudinal groove 38. It can be formed, for example, as a pack of cup springs 40. Moreover, a pressure member 41 engages into the longitudinal groove 38 and has at its lower side a concave pressing surface 42. The pressing surface 42 abuts against the outer surface of the portion 36. A guide pin 43 is fixed in the pressure member 41. The guide pin 43 extends through the cup spring 40 and engages in a guide opening 44 of the eccentric ring 35. A pin 46 is located at a side which is diametrically opposite to the pressure member 41 and serves as a cam 45. The pin 46 engages in a groove-like recess 49 of the eccentric ring 35 with substantially half of its peripheral surface. The pin 46 is surrounded at both sides by supporting rollers 47 and 48 which have identical axes. The supporting rollers 47 and 48 abut against the pin 46 and the inner wall of the longitudinal openings 37 in the eccentric ring 35, on the one hand, and are supported on a flattening 50 of the portion 36 of the pivot axle, on the other hand.

In a normal case, or in other words in the shown immovable position, the accumulator 39 presses via the pressure member 41 the pivot axle 27 via its portion 36 to abutment against the lower region in the longitudinal opening 37 of the eccentric ring 35. Thus, an extreme eccentricity of the eccentric ring 35 relative to the portion 36 takes place, which is composed from the eccentricity value and a play-eliminating value x. When a rotary movement is imparted to the pivot axle 27 via the cam pin 31, a radial displacement of the pivot axle 27 in dependence upon the direction of rotation via the supporting roller 47 or the supporting roller 48 takes place so that the accumulator 39 is compressed through the pressure member 41 and the portion 36 with overcoming of the extreme eccentricity comes to abutment against the upper region of the longitudinal opening 37. Thus, the normal eccentricity between the central point of the pivot axle and the eccentric ring 35 is obtained, so that radial play which is normally available in the bearings and in the toothing is available for facilitating the adjusting steps. When the adjusting movement is interrupted, the extreme eccentric position shown in FIG. 4 is again obtained via the accumulator 39, whereby the radial play in the immovable position is again completely eliminated. In this position, as can be seen from FIG. 3, the bearing play between the pivot axle 27 and the bearing bush 34, as well as the disk 32, is located exclusively at the upper side of the pivot axle 27, whereas the bearing play of the spur gear 23 is located exclusively at the lower side of the eccentric ring 35.

In the embodiment shown in FIGS. 3 and 4, the guide pin 43 can be introduced in the pressure member 41 with play and its length can be dimensioned so that it is supported on the inner opening of the spur gear 23 and on the portion 36 of the pivot axle. Thereby the guide pin 43, in addition to the accumulator 39, prevents the displacement of the pivot axle 27 in the movement position when it is located in the extreme eccentric position. For providing a reduction of the eccentric position, recesses are brought on the outer surface of the portion 36 of the pivot axle at both sides of the guide pin 43 in the circumferential direction. When a rotary movement is imparted via the cam pin 31 to the pivot axle 27, it is first rotated so that in dependence upon the direction of rotation 1 of the recesses aligns with the guide pin. Only after this the radial displacement can take place in the known manner.

Figure 5:
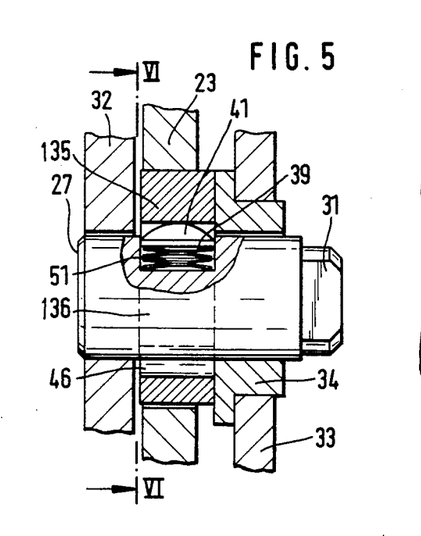
FIG. 5 is a view substantially corresponding to the view of FIG. 3 but showing a further embodiment of a pivot axle for a wobble transmission.
Figure 6:
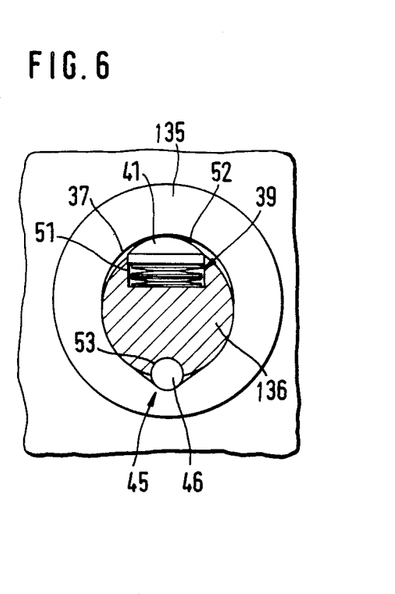
FIG. 6 is a view showing the pivot axle of FIG. 5, taken in section along the line VI—VI in FIG. 5.

The embodiment shown in FIGS. 5 and 6 corresponds in principle to the embodiment of FIGS. 3 and 4. The difference is, however, in that the accumulator 39 and the pressure member 41 are arranged in a recess 51 of the portion 136 of the pivot axle. The pressure member 41 has a convex pressing surface 52 which in its upper apex point abuts against the longitudinal opening 37 of the eccentric ring 135. The diametrically oppositely arranged cam 45 also includes a pin 46 which engages in a recess of the eccentric ring 135 on the one hand, and is surrounded by a groove 53 in the portion 136 of the pivot axle in a semicircular manner, on the other hand. By imparting the rotary movement to the pivot axle 27 in the embodiment shown in FIGS. 5 and 6, the eccentric ring 35 is pulled downwardly via the pin 46 laterally upwardly travelling in the recess of the eccentric ring 135 and through the mushroom-shaped pressure member 41 with compression of the accumulator 39, so that the upper region of its longitudinal opening 37 comes to abutment against the upper peripheral region of the portion 136. Thus the extreme eccentric position is restored to the normal eccentric position, so that here also an easy adjustment movement is possible.

Figures 7, 8:
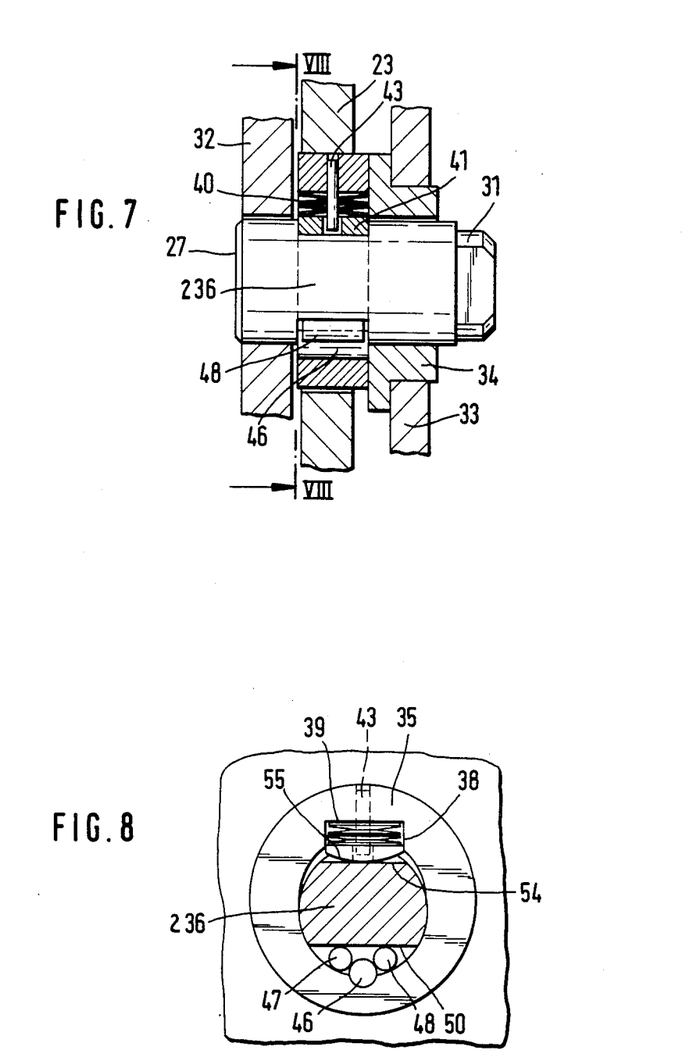
FIG. 7 is a view showing still another embodiment of a pivot axle of a wobble transmission, analogously to the views of FIGS. 3 and 5.
FIG. 8 is a view showing the pivot axle of FIG. 7 with the eccentric ring arranged thereon, in a section taken along the line VIII—VIII in FIG. 7.

The embodiment shown in FIGS. 7 and 8 substantially corresponds to the embodiment of FIGS. 3 and 4. The difference is, however, that in addition to an elongated groove 38, in the eccentric ring 35, a flattening 54 is provided at the corresponding location of the portion 236 of the pivot axle. Also, a fitting piece which serves as the pressure member 41 and engages together with the accumulator in the longitudinal groove 38 has a convex pressing surface 55. The operation of the embodiment shown in these Figures is similar to the operation of the embodiment of FIGS. 3 and 4.

Figure 10:
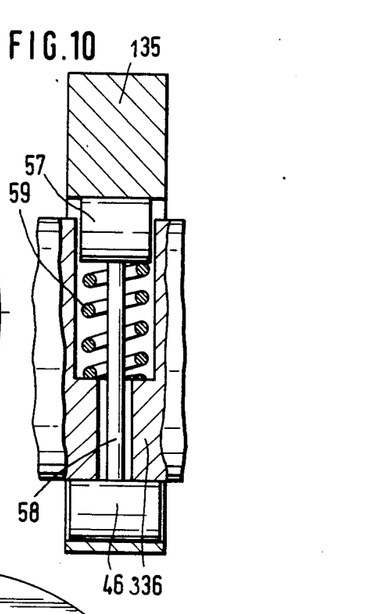
FIG. 10 is a view showing a pivot axle of FIG. 9 with the eccentric ring arranged thereon, in a section taken along the line X—X in FIG. 9.
Figure 11:
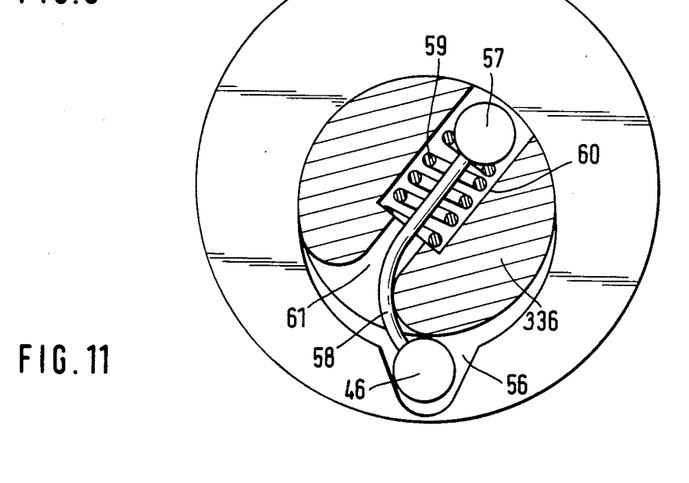
FIG. 11 is a view showing a centric portion of the pivot axle of FIG. 9, which is turned to the return position with the extreme eccentricity.

The embodiment shown in FIGS. 9-11 deviates from the above described embodiments, although, this embodiment has the same principle. The eccentric ring 135 also has a longitudinal opening 37 with the above described criterion. However, the longitudinal opening has at its side opposite to the eccentric highest point a receiving funnel 56 for the cam 45 formed as the pin 46. The pressure member 41 adjacent to the eccentric highest point is also formed as a pin 57 which is connected with the pin 46 serving as cam by a flexible pulling member 58. The pin 57 serving as a pressure member, and an accumulator which loads the pin 57 and can be formed for example as a helical pressure spring 59, engage in a cylindrical opening 60 of the portion 336 of the pivot axle. Starting from the base of this recess, the portion 336 has a radially extending opening 61 which is rounded in its outlet region toward the receiving funnel 56.

When in the beginning of the adjusting movement the pivot axle with its portion 336 is rotated to the position shown in FIG. 11, the pressing pin 57 is pulled via the pulling member 58 against the force of the pressure spring 59, and the cam pin 46 slides upwardly on a wall side of the receiving funnel 56 so that the eccentric ring 135 comes to abutment against the upper side of the portion 336 of the pivot axle. Thereby the value x is overcome and the eccentric ring 135 assumes a normal eccentricity city relative to the central point of the pivot axle with the value e. Thereby the manufacturing bearing play and toothing play are again active, so that an easy displacement of the hinge is possible. After interruption of the adjusting movement, the pressing pin 57 is again pressed upwardly via the pressure spring 59 in eccentric direction, so that the eccentric ring 135 assumes the position against the portion 336 as shown in FIGS. 9 and 10 for complete elimination of the radial play. Thus, it comes to a play-free blocking of the structural elements of the adjusting arrangement 22 of the hinge.

Figure 12:
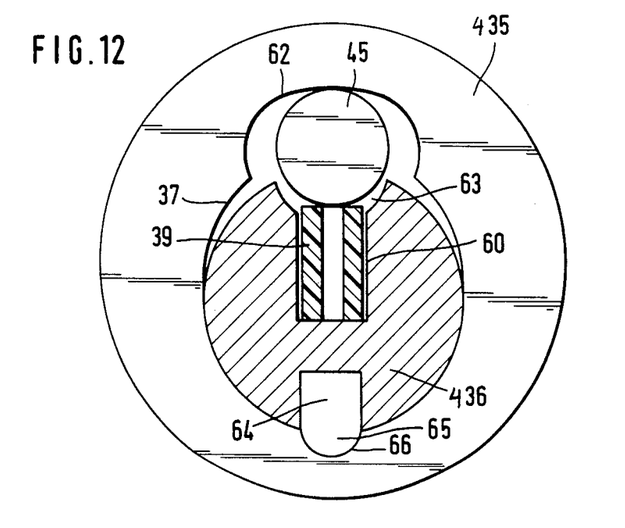
FIG. 12 is a view showing still a further embodiment of the inventive pivot axle in a cross section through the centric portion which carries the eccentric, wherein the eccentric ring is located in its extreme eccentric position.
Figure 13:
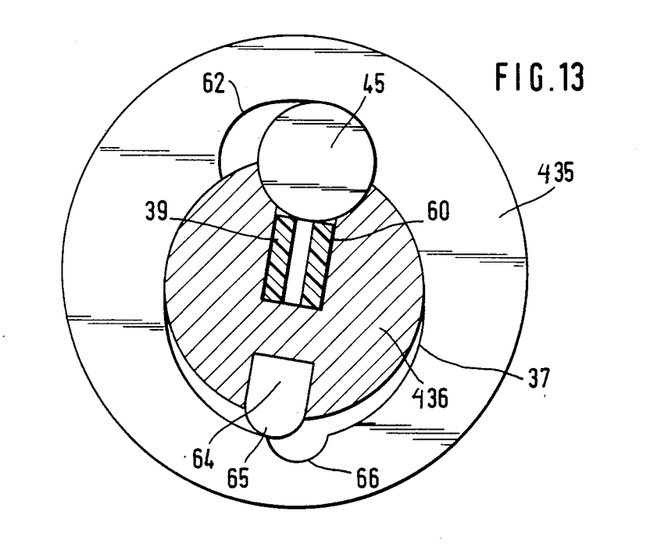
FIG. 13 is a view showing the pivot axle of FIG. 12 with the eccentric ring arranged thereon, wherein because of rotation of the centric portion of the pivot axle it is also pressed back to its extreme eccentric position.

The embodiment shown in FIGS. 12 and 13 deviates from the above described embodiments in that the cam 45 arranged between the eccentric ring 435 and the portion 36 of the pivot axle is loaded by an accumulator 39. This accumulator is also received in a substantially cylindrical recess 60 in the portion 436 of the pivot axle 27. The pin-shaped cam 45 on the other hand extends more sectionwise in the recess 62 of the eccentric ring 435, which surrounds the cam pin in circumferential direction of the eccentric ring at both ends with play. The portion 436 at the upper end of its cylindrical recess 60 is provided with a groove 63 formed as a cylindrical segment in which the cam pin 45 after compression of the pressure accumulator 39 can sectionally closingly engage. The portion 436 at its side opposite to the cam pin 45 is provided with a pressure strip 64 which in immovable position of the adjusting arrangement engages with a projection 65 in a groove 66 of the eccentric ring 435 in a closing manner.

When a rotary movement is imparted to the pivot axle in the embodiment of FIGS. 12 and 13, the portion 436 of the pivot axle is rotated to the position shown in FIG. 13. The projection 65 of the pressure strip 64 travels outwardly of the groove 66 and thereby the eccentric ring comes to abutment with the upper region of its longitudinal opening 37 against the portion 436 of the pivot axle. Simultaneously, the lateral play of the recess 32 is dimensioned at both sides such that, in the position of the portion 436 the eccentric ring 435 shown in FIG. 13, the cam pin 45 abuts at one side of the recess 62 in torque-transmitting manner with compression of the accumulator 39. As can be easily seen from FIG. 13, the rotary angle from the moment of starting the rotary movement in the pivot axle to the entraining of the eccentric ring is smaller than in the embodiment shown in FIGS. 9-13. Also, in this embodiment, an extreme eccentricity in immovable position between the central point of the pivot axle and the eccentric central point is adjustable, which can be brought back into adjusting position to the normal eccentricity value.

Figure 14:
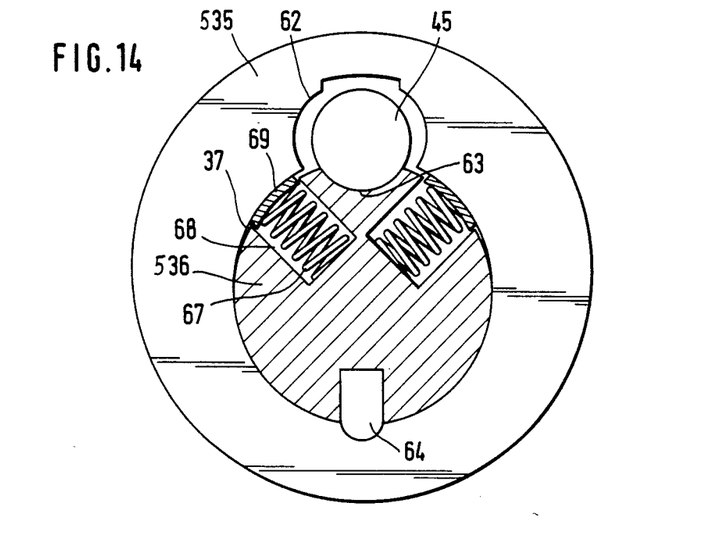
FIG. 14 is a view showing a further improvement of the embodiment of FIGS. 12 and 13 with the utilization of two accumulators which are offset relative to the cam member.

The embodiment shown in FIG. 14 is a further development of the embodiment of FIGS. 12 and 13. Here, the cam pin 45 is, however, not loaded by an accumulator. Instead, the cam pin engages in a groove 63 of the portion 536 of the pivot axle and comes to abutment in the adjusting case against a lateral wall of the recess 62 of the eccentric ring 535. For producing the blocking position between the eccentric ring 535 and the portion 536 of the pivot axle, two helical pressure springs 67 are provided. They are offset relative to one another and serve as an accumulator. The helical pressure springs 67 are inserted in cylindrical recesses 68 which are arranged at substantially 45° to the vertical plane of the pressure strip 64 at both sides of the cam pin 45. They abut with pressure disks 69 against the upper inner wall of the longitudinal opening 37 of the eccentric ring 535.

Figure 15:
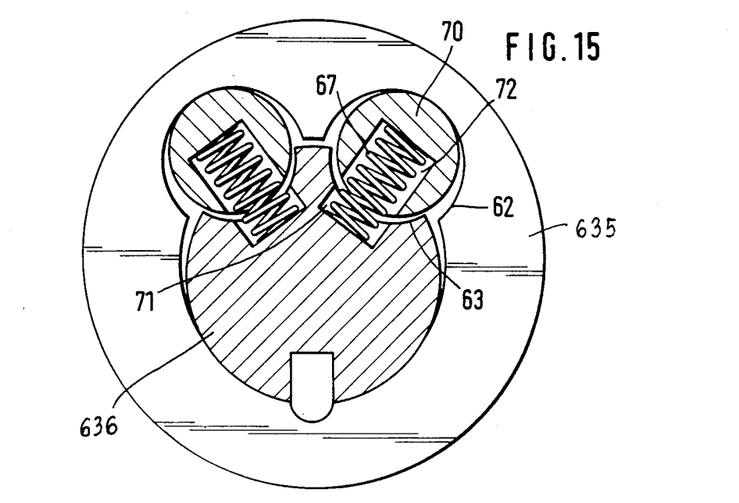
FIG. 15 is a view showing still a further improvement of the embodiment of FIG. 14, with the utilization two cam members associated with the two accumulators.

The embodiment shown in FIG. 15 is based upon substantially the embodiment of FIGS. 12 and 13, and the embodiment of FIG. 14. In contrast to the embodiment of FIG. 14, this embodiment has two cam pins 70 which engage in two respective recesses 62 of the eccentric ring 635 with their upper regions. The lower region of the cam pins 70 can also engage in the grooves 63 of the portion 636, which are also offset relative to one another. Cylindrical openins 71 are provided in the bottom of the grooves 63 in the portion 636, and respective cylindrical openings 72 are provided in the pins 70 opposite to the first-mentioned cylindrical openings. The cylindrical openings 71 and 72 receive a helical pressure spring 67 which serves as an accumulator and retain in immovable position of the hinge the eccentric ring 635 on the portion 636 in position shown in FIG. 15. The operation of the embodiment of FIGS. 14 and 15 substantially corresponds to the operation of the embodiment of FIGS. 12 and 13.

All the above described embodiments lie, because of their dimensions and design, in the region of self-locking, so that even high forces acting upon the backrest do not lead to a displacement of the hinge.

It will be understood that each of the elements described above, or two or more together, may also find a useful application in other types of constructions differing from the types described above.

While the invention has been illustrated and described as embodied in a hinge for a seat with displaceable backrest, particularly a power vehicle seat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hinge for a seat having a seat part and an adjustable backrest part, particularly a power vehicle seat, the hinge comprising
   a stationary hinge member associated with a seat part of the seat;
   a pivotable hinge member associated with a backrest part of the seat;
   a pivot axle pivotally connecting said hinge members with one another and having a centric portion;
   adjusting and fixing means arranged to act upon and to determine a position of said hinge members relative to one another and formed as a wobble transmission, said wobble transmission having an eccentric member associated with a cam region of said pivot axle and rotatable together with said pivot axle, said eccentric member having a recess;
   an accumulator arranged in the cam region of said pivot axle to radially adjust an eccentricity which determines an engaging point of said wobble transmission, said eccentric member being formed as an eccentric ring with an inner opening formed as a longitudinal opening extending in direction of eccentricity and surrounding said centric portion of said pivot axle;
   a pressing member located between said longitudinal opening and said centric portion of said pivot axle and arranged to be pressed by said accumulator for maintaining an extreme eccentricity in static condition; and
   a cam member arranged to connect said eccentric ring with said centric portion of said pivot axle against the action of said accumulator with reducing of the eccentricity and in a torque-transmitting member so that in static condition said accumulator acts to maintain the extreme eccentricity, while by turning said pivot axle said cam member reduces the eccentricity so as to facilitate adjustment, said cam member being supported on said centric portion of said pivot axle and engaging in said recess of said eccentric ring, and said pressing member being located substantially diametrically opposite to said cam member.

2. A hinge as defined in claim 1, wherein said pivot axle has an axis, said cam member being formed as a pin arranged in an axial direction of said pivot axle.

3. A hinge as defined in claim 1, wherein said eccentric ring has a longitudinal groove, said centric portion of said pivot axle having a flattened surface, said pressing member being formed as a fitting member which engages in said longitudinal groove of said eccentric ring and has a convex pressing surface abutting against said flattened surface of said centric portion of said pivot axle.

4. A hinge for a seat having a seat part and an adjustable backrest part, particularly a power vehicle seat, the hinge comprising
   a stationary hinge member associated with a seat part of the seat;
   a pivotable hinge member associated with a backrest part of the seat;
   a pivot axle pivotally connecting said hinge members with one another and having a centric portion;
   adjusting and fixing means arranged to act upon and to determine a position of said hinge members relative to one another and formed as a wobble transmission, said wobble transmission having an eccentric member associated with a cam region of said pivot axle and rotatable together with said pivot axle;
   an accumulator arranged in the cam region of said pivot axle to radially adjust an eccentricity which determines an engaging point of said wobble transmission, said eccentric member being formed as an eccentric ring with an inner opening formed as a longitudinal opening extending in direction of eccentricity and surrounding said centric portion of said pivot axle, said eccentric ring having a longitudinal groove and a recess;
   a pressing member located between said longitudinal opening and said centric portion of said pivot axle and arranged to be pressed by said accumulator for maintaining an extreme eccentricity in immovable condition, said pressing member being formed as a fitting piece which engages in said longitudinal groove of said eccentric ring and has a concave pressing surface, said accumulator acting upon said fitting member and being formed as a set of cup springs engageable by a guiding pin and arranged between said pressing member and a base of said longitudinal groove of said eccentric ring; and a cam member arranged to connect said eccentric ring with said centric portion of said pivot axle against the action of said accumulator with reducing of the eccentricity and in a torque-transmitting member, said cam member being supported on said centric portion of said pivot axle and engaging in said recess of said eccentric ring, and said pressing member being located substantially diametrically opposite to said cam member.

5. A hinge for a seat having a seat part and an adjustable backrest part, particularly a power vehicle seat, the hinge comprising a stationary hinge member associated with a seat part of the seat;

a pivotable hinge member associated with a backrest part of the seat;

a pivot axle pivotally connecting said hinge members with one another and having a centric portion with a recess;

adjusting and fixing means arranged to act upon and to determine a position of said hinge members relative to one another and formed as a wobble transmission, said wobble transmission having an eccentric member associated with a cam region of said pivot axle and rotatable together with said pivot axle;

an accumulator arranged in the cam region of said pivot axle to radially adjust an eccentricity which determines an engaging point of said wobble transmission, said eccentric member being formed as an eccentric ring with an inner opening formed as a longitudinal opening extending in direction of eccentricity and surrounding said centric portion of said pivot axle, said eccentric ring having a recess;

a pressing member located between said longitudinal opening and said centric portion of said pivot axle and arranged to be pressed by said accumulator for maintaining an extreme eccentricity in static condition, said pressing member being formed as a fitting member which engages in recess of said centric portion of said pivot axle and has a concave pressing surface, said accumulator acting upon said fitting member being formed as a set of cup springs arranged between said pressing member and a base of said recess of said centric portion of said pivot axle; and a cam member arranged to connect in case of adjusting said eccentric ring with said centric portion of said pivot axle against the action of said accumulator with reducing of the eccentricity and in a torque-transmitting member, said cam member being supported on said centric portion of said pivot axle and engaging in said recess of said eccentric ring, and said pressing member being located substantially diametrically opposite to said cam member.

6. A hinge for a seat having a seat part and an adjustable backrest part, particularly a power vehicle seat, the hinge comprising a stationary hinge member associated with a seat part of the seat;

a pivotable hinge member associated with a backrest part of the seat;

a pivot axle pivotally connecting said hinge members with one another and having a centric portion;

adjusting and fixing means arranged to act upon and to determine a position of said hinge members relative to one another and formed as a wobble transmission, said wobble transmission having an eccentric member associated with a cam region of said pivot axle and rotatable together with said pivot axle;

an accumulator arranged in the cam region of said pivot axle to radially adjust an eccentricity which determines an engaging point of said wobble transmission, said eccentric member being formed as an eccentric ring with an inner opening formed as a longitudinal opening extending in direction of eccentricity and surrounding said centric portion of said pivot axle, said eccentric ring having a recess;

a pressing member located between said longitudinal opening and said centric portion of said pivot axle and arranged to be pressed by said accumulator for maintaining an extreme eccentricity in immovable condition;

a cam member formed as a pin and arranged to connect said eccentric ring with said centric portion of said pivot axle against the action of said accumulator with reducing of the eccentricity and in a torque-transmitting member, said cam member being supported on said centric portion of said pivot axle and engaging in said recess of said eccentric ring, and said pressing member being located substantially diametrically opposite to said cam member; and two laterally arranged supporting rollers having identical axes and pressing said pin against said flattened surface of said centric portion of said pivot axle.

7. A hinge for a seat having a seat part and an adjustable backrest part, particularly a power vehicle seat, the hinge comprising a stationary hinge member associated with a seat part of the seat;

a pivotable hinge member associated with a backrest part of the seat;

a pivot axle pivotally connecting said hinge members with one another and having a centric portion with a recess;

adjusting and fixing means arranged to act upon and to determine a position of said hinge members relative to one another and formed as a wobble transmission, said wobble transmission having an eccentric member associated with a cam region of said pivot axle and rotatable together with said pivot axle;

an accumulator arranged in the cam region of said pivot axle in said recess of said centric portion to radially adjust an eccentricity which determines an engaging point of said wobble transmission, said eccentric member being formed as an eccentric ring with an inner opening formed as a longitudinal opening extending in direction of eccentricity and surrounding said centric portion of said pivot axle, said eccentric ring having a recess;

a pressing member located between said longitudinal opening and said centric portion of said pivot axle and arranged to be pressed by said accumulator for maintaining an extreme eccentricity in immovable condition; and a cam member arranged to connect in case of adjusting said eccentric ring with said centric portion of said pivot axle against the action of said accumulator with reducing of the eccentricity and in a torque-transmitting member said cam member being formed as a pin, said pressing member being also formed as a pin extending in axial direction and loaded by said accumulator, said pins being connected with one another by a flexible pulling member extending through said centric portion of said pivot axis, said cam member being supported on said centric portion of said pivot axle and engaging in said recess of said eccentric ring, and said pressing member being located substantially diametrically opposite to said cam member.

8. A hinge for a seat having a seat part and an adjustable backrest part, particularly a power vehicle seat, the hinge comprising a stationary hinge member associated with a seat part of the seat;

a pivotable hinge member associated with a backrest part of the seat;

a pivot axle pivotally connecting said hinge members with one another and having a centric portion with a recess and a groove;

adjusting and fixing means arranged to act upon and to determine a position of said hinge members relative to one another and formed as a wobble transmission, said wobble transmission having an eccentric member associated with a cam region of said pivot axle and rotatable together with said pivot axle;

an accumulator arranged in the cam region of said pivot axle to radially adjust an eccentricity which determines an engaging point of said wobble transmission, said eccentric member being formed as an eccentric ring with a groove and an recess and also with an inner opening formed as a longitudinal opening extending in direction of eccentricity and surrounding said centric portion of said pivot axle;

a pressing member located between said longitudinal opening and said centric portion of said pivot axle and arranged to be pressed by said accumulator for maintaining an extreme eccentricity in static condition; and a cam member arranged to connect said eccentric ring with said centric portion of said pivot axle against the action of said accumulator with reducing of the eccentricity and in a torque-transmitting member, said cam member including a pin and being directly loaded by said accumulator located in said recess of said centric portion of said pivot axle, said pin sectionally engaging in said recess of said eccentric ring which surrounds said pin at both sides with a play and touches at its upper side, said pin also closingly engaging sectionally in said groove of said centric portion of said pivot axle with said accumulator in compressed state, said centric portion of said pivot axle having a side which is opposite to said pin and has a pressing strip with a roller-shaped projection engaging in immovable condition in said notch of said eccentric ring, said pressing member being located substantially diametrically opposite to said cam member.

9. A hinge as defined in claim 8, wherein said recess of said centric portion of said pivot axle includes two mutually opposite recess portions which are offset from a radial plane of said pressing strip and are arranged at opposite side from said pressing strip, said accumulator including two accumulator members each located in a respective one of said recess portions and provided with a pressing disk via which it abuts inwardly against said eccentric ring.

10. A hinge as defined in claim 8, wherein said recess of sa eccentric ring has two recess portions, said recess of said centric portion of said pivot axle includes two mutually opposite recess portions which are offset from a radial plane of said pressing strip and are arranged at opposite side from said pressing strip, said cam including two such pins each having a recess and engaging in a respective one of said recesses of said eccentric ring and in a respective one of said recesses of said centric portion of said pivot axle in play-free manner in case of adjusting, said accumulator having two accumulator members each engaging in a respective one of said recesses of said centric portion of said pivot axle and also in a respective one of said recesses of said pins.

* * * * *